United States Patent
Dutta (10) Patent No.: US 6,718,365 B1
(45) Date of Patent: Apr. 6, 2004

(54) METHOD, SYSTEM, AND PROGRAM FOR ORDERING SEARCH RESULTS USING AN IMPORTANCE WEIGHTING

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/549,153

(22) Filed: Apr. 13, 2000

(51) Int. Cl.$^7$ ............................................. G06F 15/16
(52) U.S. Cl. ..................... 709/203; 709/245; 709/217; 707/3; 707/4; 707/5; 707/6
(58) Field of Search ................................ 709/219, 203, 709/245; 707/3–6

(56) References Cited

U.S. PATENT DOCUMENTS

| | | | | | |
|---|---|---|---|---|---|
| 5,918,014 | A | * | 6/1999 | Robinson | 709/219 |
| 6,032,162 | A | * | 2/2000 | Burke | 709/206 |
| 6,041,360 | A | * | 3/2000 | Himmel et al. | 709/245 |
| 6,098,065 | A | * | 8/2000 | Skillen et al. | 707/3 |
| 6,208,995 | B1 | * | 3/2001 | Himmel et al. | 707/104.1 |
| 6,272,507 | B1 | * | 8/2001 | Pirolli et al. | 707/5 |
| 6,356,899 | B1 | * | 3/2002 | Chakrabarti et al. | 707/5 |
| 6,408,316 | B1 | * | 6/2002 | Himmel et al. | 709/203 |
| 6,453,315 | B1 | * | 9/2002 | Weissman et al. | 707/5 |
| 6,487,495 | B1 | * | 11/2002 | Gale et al. | 701/209 |
| 6,493,702 | B1 | * | 12/2002 | Adar et al. | 707/3 |
| 6,546,387 | B1 | * | 4/2003 | Triggs | 707/5 |
| 6,584,471 | B1 | * | 6/2003 | Maclin et al. | 707/104.1 |
| 6,631,496 | B1 | * | 10/2003 | Li et al. | 707/10 |

OTHER PUBLICATIONS

K. Jonkheer, "Intelligent Agents, Markets and Competition: Consumer's Interests and Functionality of Destination Sites", [online], Retrieved from the Internet, URL:http://www.firstmonday.com, [retrieved on Mar. 17, 2000].

W–S Li et al., "PowerBookmarks: a Systems for Personalizable Web Information Organization, Sharing and Management", Computer Networks, The International Journal of Computer and Telecommunications Networking, vol. 31, Nos. 11–16, May 17, 1999, Proceedings of the 8$^{th}$ International World Wide Web Conference May 11–14, 1999, Toronto, Canada, pp. 1375–1389.

C. Sherman, "Bookmark Manager Roundup", Online Page: 56, Oct. 1, 1999, Retrieved from the Internet ,URL<http://www.DR–LINK.com, pp. 1–12.

A. Wexelblat, "Supporting Communities on the Net", Alan Wexelblat<wex@media.mit.edu>, Jul. 14, 1995 [retrieved Mar. 17, 2000], Retrieved from the Internet, URL<http://mevard.www.media.mit.edu/people/wex/rate–proposal–ACF.html.

* cited by examiner

Primary Examiner—Dung C. Dinh
Assistant Examiner—Anita Choudhary
(74) Attorney, Agent, or Firm—Janki K. Parda; Konrad Raynes & Victor LLP (57) ABSTRACT

Disclosed is a technique for providing, accessing, and using bookmark data to supplement information in a search engine database. The bookmark data indicates saved user selected network addresses, e.g., URLs, that are capable of being selected to access observable data, e.g., a page of text, images, sound file, movie file, etc., at the selected network address. A user computer receives user modifications to bookmark data and transmits the modifications to the bookmark data to a server over a network. A server gathers bookmark data indicating saved user selected network addresses that the user is capable of selecting to access observable data at the selected network address. A search engine server receives bookmark data gathered from multiple Internet users and determines an importance rating for at least one network address from the received bookmark data. The determined importance rating is included in the search engine index. Further, when executing a search query against the index to determine at least one search result, the search engine server presents the search results ordered according to their importance rating.

45 Claims, 7 Drawing Sheets

METHOD, SYSTEM, AND PROGRAM FOR ORDERING SEARCH RESULTS USING AN IMPORTANCE WEIGHTING

BACKGROUND OF THE INVENTION

1. Field of the Invention

The present invention relates to a method, system, and program for ordering search results using an importance rating and, in particular, using user bookmark data to determine the importance rating.

2. Description of the Related Art

To locate documents on the Internet, users typically use an Internet search engine. Internet users enter one or more key search terms which may include boolean operators for the search, and transmit the search request to a server including a search engine. Search engines include a spider program or crawler that periodically visits web pages, searches the Internet to locate new web pages, and revises previously located sites to look for changes. The spider then places information from the pages it locates into a database index which relates URLs to search terms.

Search engines can index various information from located pages to associate with the URL of each page. For example, many search engines index the full body of visible text, but may exclude commonly used words, e.g., "the", "and", etc. Search engines may also index keywords included in a special keyword meta tag in the document that holds key words the page designer designates to use for searching purposes. Search engines may include alternative text associated with images and perform word stemming to include variations of a word, e.g., politics, politician, political, etc. as keywords to include in the index. The keywords indexed for a particular URL are then searched when a user enters the keywords for a search. The results of a search include all URLs having indexed words that match the search term and any specified boolean search operators.

The response to a query is often determined by how keywords are indexed for a URL. In author-controlled search engines, the search engine providers allow the document author to designate the indexed keywords by specifying such words in the document. However, author oriented search engines provide document authors the opportunity to include misleading words in the meta tags to cause the search engine to return the document in response to searches unrelated to the document content. Other search engine providers use an editor-controlled approach, where the search engine provider employs editors to manually catalog web sites and the indexed keywords that will be used in searching. However, editor-controlled search engines can result in irrelevant search results if the editors associate the wrong keywords with the URL or exclude highly relevant key words from the URL/key word association.

A search engine may locate numerous search results in response to a user search query, many of which may not be relevant. One problem search engine developers must address is the order in which to present the search results. Most search engines use the location and frequency of keywords on a web page as the basis of ranking search results. After obtaining multiple URL search results, search engines may order the URL search results based on the number of search keywords included in the meta description and keywords tag for the page of each URL search result. A search engine can also order the URL search results based on the number of pages and/or number of important web pages that include hypertext links to the URL search result page. In both such cases, the search engine is assigning some importance weighting to each returned search result to determine the order in which the URL search results will be presented to the user.

To improve how results are presented, one search engine company, Direct Hit, has developed algorithms to rank search results according to the popularity of the site. The Direct Hit search engine anonymously monitors which web sites Internet searchers select from the search results list, how much time the searchers spend at these sites and other metrics. The sites that are selected by searchers are boosted in their ranking, while the sites that are consistently ignored by searchers are penalized in their rankings.

One disadvantage for ranking the popularity of web sites based on the pages a user selects and reviews is that in many cases Internet users may view a page inadvertently or accidentally without having any real interest in the content of the page. For instance, Internet users may select an advertisement to view the advertisers's page to take "a quick look" to only determine that the page is of no interest and immediately return to the previously viewed page or another page. For this reason, ranking search results based on the number of hits a page receives may boost the ranking of pages that are not particularly important to the Internet user.

For this reason, there is a need in the art for a methodology for ranking web pages that considers the importance of web pages to a user.

SUMMARY OF THE PREFERRED EMBODIMENTS

To overcome the limitations in the prior art described above, preferred embodiments disclose a method, system, and program for providing, accessing, and using bookmark data to supplement information in a search engine database. The bookmark data indicates saved user selected network addresses, e.g., URLs, that are capable of being selected to access observable data, e.g., a page of text, images, sound file, movie file, etc., at the selected network address.

In the preferred embodiments, a user computer may receive user modifications to bookmark data and transmit the modifications to the bookmark data to a server over a network, wherein the transmitted bookmark data is used to order indexed network addresses in a search engine database. In further embodiments, the user may register for a service over the Internet to provide bookmark data to the server and, in response, receive an application program over the Internet from the server in response to registering for the service. The application program would execute at the user program to receive modifications to the bookmark data and transmit the modifications to the server.

In the preferred embodiments, a server may gather bookmark data indicating saved user selected network addresses that the user is capable of selecting to access observable data at the selected network address. The server registers Internet users over the Internet for a service and transmits over the Internet an application program to execute at computers of registered users connected to the Internet. The server receives from the application program executing on the user computers connected to the Internet bookmark data from the users.

In the preferred embodiments, a search engine server uses bookmark data gathered from multiple Internet users indicating saved user selected network addresses. The user may select the saved network address to access the observable data, such as a page of text, images, sound file, movie file, etc., at the selected network address. The search engine server maintains an index of network addresses and at least one keyword associated with each network address. User observable data is maintained at the page at the network address.

The search engine server receives bookmark data gathered from multiple Internet users and determines an importance rating for at least one network address from the received bookmark data. The determined importance rating is included in the search engine index. Further, when executing a search query against the index to determine at least one search result, the search engine server presents the search results ordered according to their importance rating.

Preferred embodiments provide a technique for determining user indicated importance of web pages from the user's bookmark selection of URL web pages. Preferred embodiments provide a method, system, and program for transmitting the bookmark data and any modifications thereto to a bookmark data gatherer server. Preferred embodiments also provide an Internet service managed by a bookmark data gatherer to gather bookmark data from multiple Internet users. The bookmark data is then used by a search engine server to determine an importance rating for URL entries in the search engine URL index based on bookmark entries for the URL. For instance, the importance weight may increase for a URL added to a bookmark file and decrease for a URL removed from a bookmark file. Further, user selection of classification terms in the bookmark file may be used to supplement the search keywords for the URL as the classification term represents a user description of the bookmarked URL.

In this way, preferred embodiments provide a technique for translating subjective user preferences for web pages as indicated in the user bookmark file into an importance rating of the URL. This importance rating may then be used to order URLs returned in response to a search request to present to the searcher the results in the order of subjective importance to Internet users.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
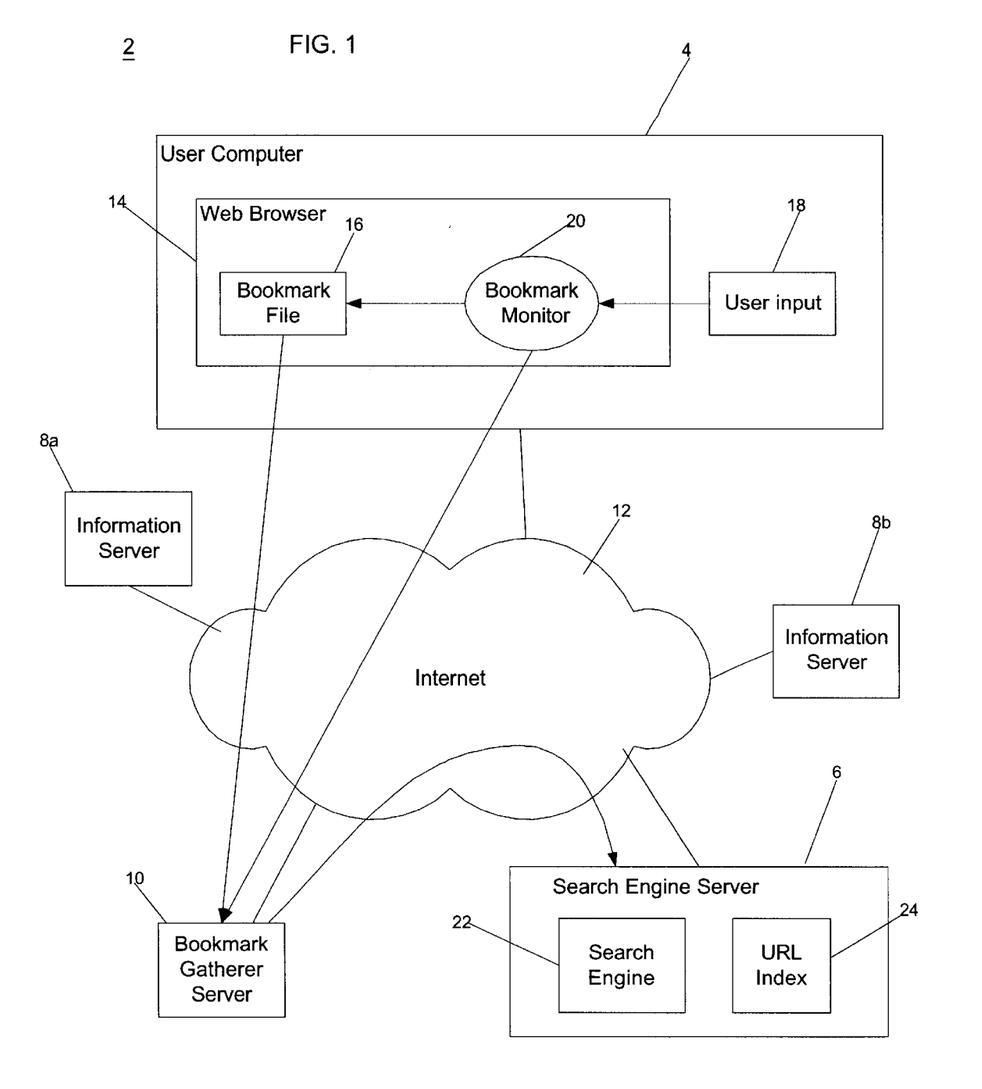
FIG. 1 illustrates a computing environment architecture in accordance with preferred embodiments of the present invention.

FIG. 1 illustrates a computing environment in which preferred embodiments are implemented. The computing environment 2 includes multiple user computers 4 (only one is shown), search engine server 6, information servers 8a, b, and a bookmark data gatherer server 10 that communicate over a network 12. The network 12 may be a TCP/IP network, such as the Internet and World Wide Web, or any other network system known in the art, e.g., LAN, Ethernet, WAN, System Area Network (SAN), Token Ring, etc. Alternatively, there may be separate and different networks between the systems 4, 6, 8a, b, and 10.

All the systems 4, 6, 8a, b, and 10 communicate using a document transfer protocol such as the Hypertext Transfer Protocol (HTTP), or any other document transfer protocol known in the art, such FTP, Gopher, WAIS, etc. The user computer 4 includes a browser program 14, such as an HTML browser, such as Netscape Communicator, Internet Explorer, etc., capable of submitting requests using the HTTP protocol in a manner known in the art.

The web browser 14 maintains a bookmark file 16 in a manner known in the art locally at the user computer 4. The user may provide input 18 via any input device known in the art, e.g., keyboard, pen stylus, mouse, voice, etc. A bookmark monitor program 20 which may be implemented as an add-on to the web browser 14 monitors any user input data 18 that alters the content of the bookmark file 16. A bookmark data gatherer site 10 would receive the bookmark file 16 and any changes to the bookmark file 16 reflected in user input data 18. Changes to the bookmark file 16 could include adding or removing a URL and specifying a category, e.g., sports, news, financial, etc., to assign a specific URL.

The bookmark gatherer server 10 provides bookmark data to the search engine server 6 to use to generate importance weights for URLs in the manner described below. Furthermore, if the user web browser 14 requests the URL for the search engine server 6, then the search engine server 6 would return an HTML page in which the user at the user computer 4 may enter keywords for an Internet search.

The search engine server 6 includes a search engine program 22 that performs search engine operations known in the art such as searching for web pages and indexing the URLs of the web pages with keywords in a URL index 24. When the user web browser 14 submits a search request to the search engine server 6, the search engine program 22 will query the URL index 24 in a manner known in the art to locate URL entries that have keywords that match the search terms according to any search operators, such as boolean operators, etc.

Figure 2:
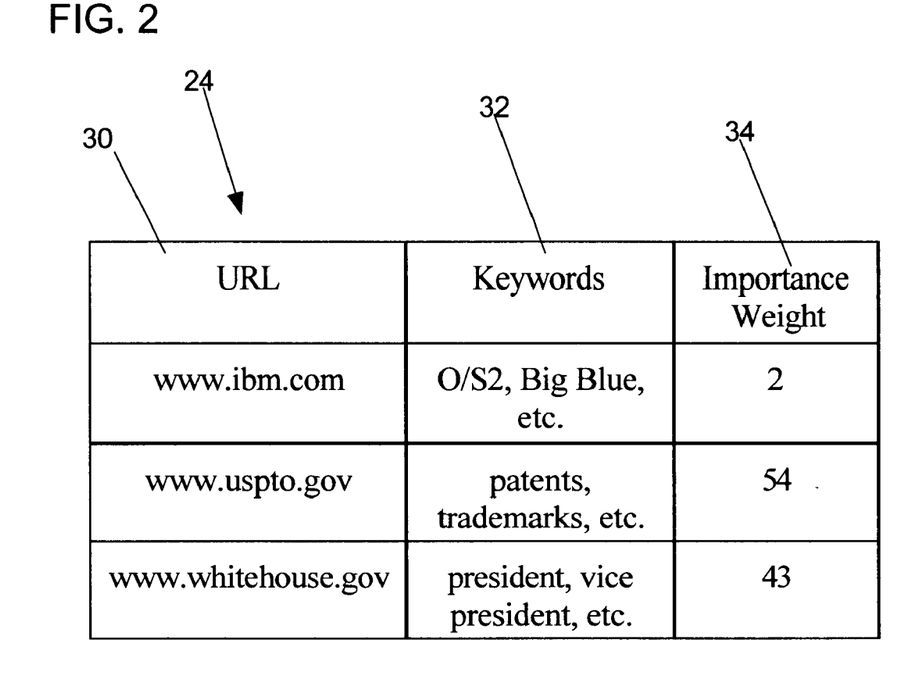
FIG. 2 illustrates an example of how URLs, keywords and importance weights are associated in accordance with preferred embodiments of the present invention.

FIG. 2 illustrates an example of the URL index 24 providing an association of a URL 30, keywords 32, and importance weight 34. The URL/keyword associations in the index 24 can be generated using prior art search engine indexing known in the art to associate URLs with keywords used for searching. Keywords can be gleaned from the title, the entire content of the document, keyword metatags, etc. The importance weight 32 indicates a cumulative importance value for each URL based on bookmark data from Internet users. This importance weight 32 is used to rank and order URLs returned in search results so those URLs having a higher importance weight, indicating a greater cumulative importance to Internet users, are presented first.

After the URLs and keywords are generated in a manner known in the art, the search engine server 6, executing a program, would associate an importance weighting with each URL entry in the search engine URL index 24. In preferred embodiments, the importance weighting is based on the number of instances in which the URL page is bookmarked in users' web browsers. Common web browsers, such as Netscape Communicator and Microsoft Explorer, include a bookmark feature that allows a user to save a URL as a bookmark for later retrieval. A user may organize bookmarked URLs under user defined category sections.

Because of privacy concerns, Internet users would have to agree to allow the search engine provider to gather information on the users' bookmark selections. For instance, an Internet Service Provider (ISP) may enter into an agreement with Internet users whereby the ISP agrees to provide free Internet service and, in return, the user agrees to allow the ISP to collect information on pages the user bookmarks. Other or alternative incentives may also be provided to encourage users to make their bookmark selections available. In preferred embodiments, a mechanism may be provided for the user to reserve certain sensitive bookmark selections as private that would not be returned to the entity gathering the bookmark data, such as the ISP or search engine manager.

In preferred embodiments, the organization gathering bookmark data, such as the ISP, search engine manager, or other third party, referred to herein as the "bookmark data gatherer" would provide users with a web browser add-on program that would cause the browser to transmit information on user bookmark activity to a web site of the bookmark gatherer. This bookmark add-on program could monitor user interaction with the web browser provided bookmark feature. In such case, user bookmark data would be maintained locally at the user's computer. Alternatively, the bookmark data gatherer could provide the user with a bookmark toolbar that is always displayed whenever the user's web browser is open. The user's bookmark data would be maintained at a web site managed by the bookmark data gatherer. The bookmark toolbar would display user specified bookmarks stored at the bookmark data gatherer web site. Any changes to the bookmarks would be made through the gatherer's web site, thereby allowing the bookmark data gatherer to collect information on a user's bookmark selection.

Figure 3:
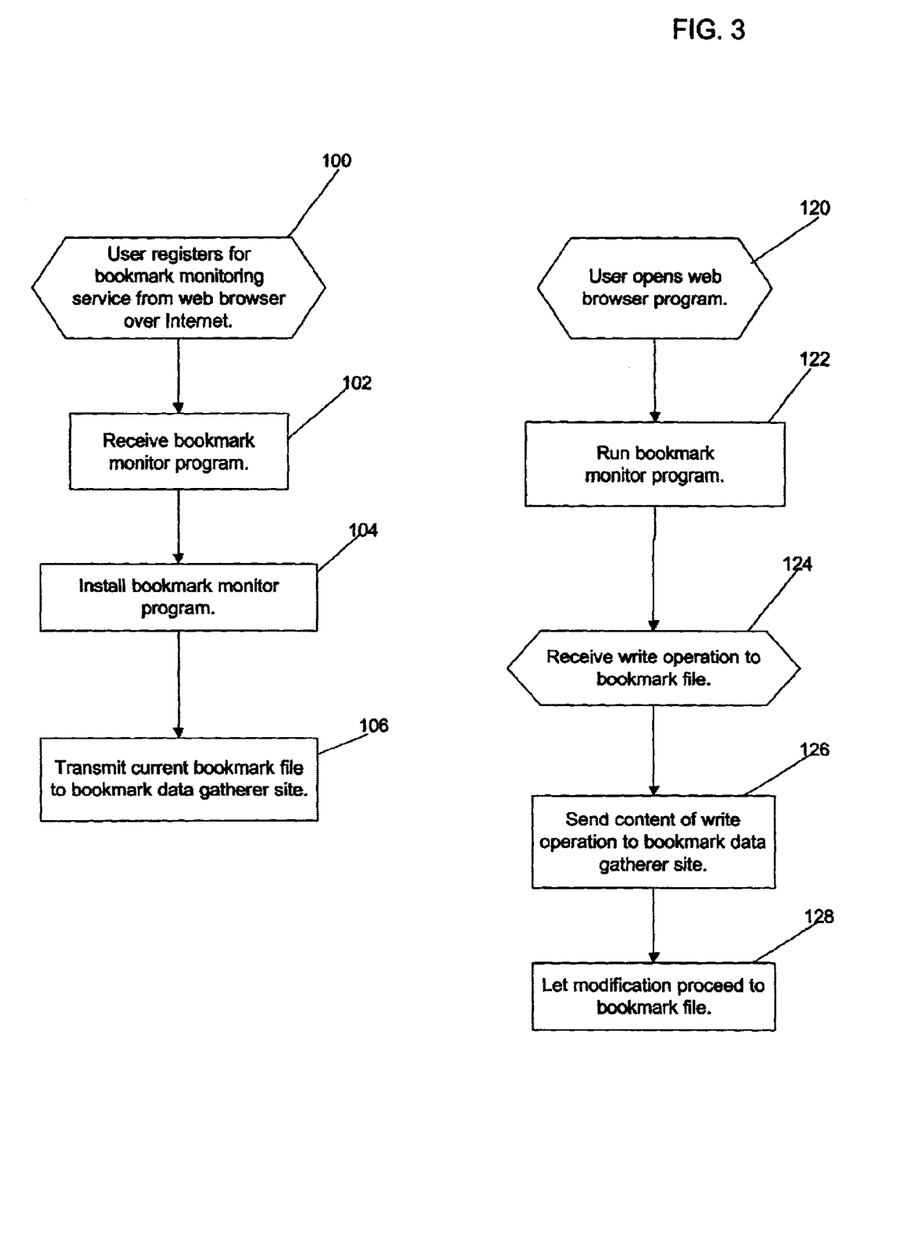
FIG. 3 illustrates logic implemented in an Internet user computer to provide bookmark data in accordance with preferred embodiments of the present invention.

FIG. 3 illustrates logic implemented in the web browser 14 of the user and the bookmark monitor program 20. The operation begins at block 100 with the user registering for the bookmark monitor program 20 over the Internet 12 using the web browser 14. As discussed, the user may agree to install the bookmark monitor 20 in return for free Internet service or some other benefit, e.g., free credits toward the purchase of some product, etc. The user would then receive the bookmark monitoring program 20 over the Internet 12 or on a CD-ROM or other storage disk through the mail. The user would then install (at block 104) the bookmark monitor program 20. Upon installation, the bookmark monitor program 20 would transfer (at block 106) the current bookmark file 16 to the bookmark gatherer site 10 over the Internet 12. In preferred embodiments, there would be different versions of the bookmark monitor program 20 for different web browsers, e.g., Netscape Communicator, Microsoft Internet Explorer, etc., and for different operating systems, e.g., Linux, Windows, O/S2, etc.**

**Microsoft and Windows are registered trademarks of Microsoft Corporation; OS/2 is a registered trademark of International Business Machines Corporation; Netscape is a registered trademark and Netscape Communicator is a trademark of Netscape Communications Corporation.

Upon the user opening the web browser 14 (at block 120), the bookmark monitor program 20 would also begin executing to monitor user input 18 to the bookmark file 16. Upon receiving a write operation to the bookmark file 16 (at block 124), the bookmark monitor program 20 would send (at block 126) the content of the write operation indicating a URL to add or delete from the bookmark file 16 to the bookmark gatherer site 10. The write operation can then proceed (at block 128) against the bookmark file 16 maintained locally at the user computer running the web browser 14 and bookmark monitor 20 programs.

Figure 4:
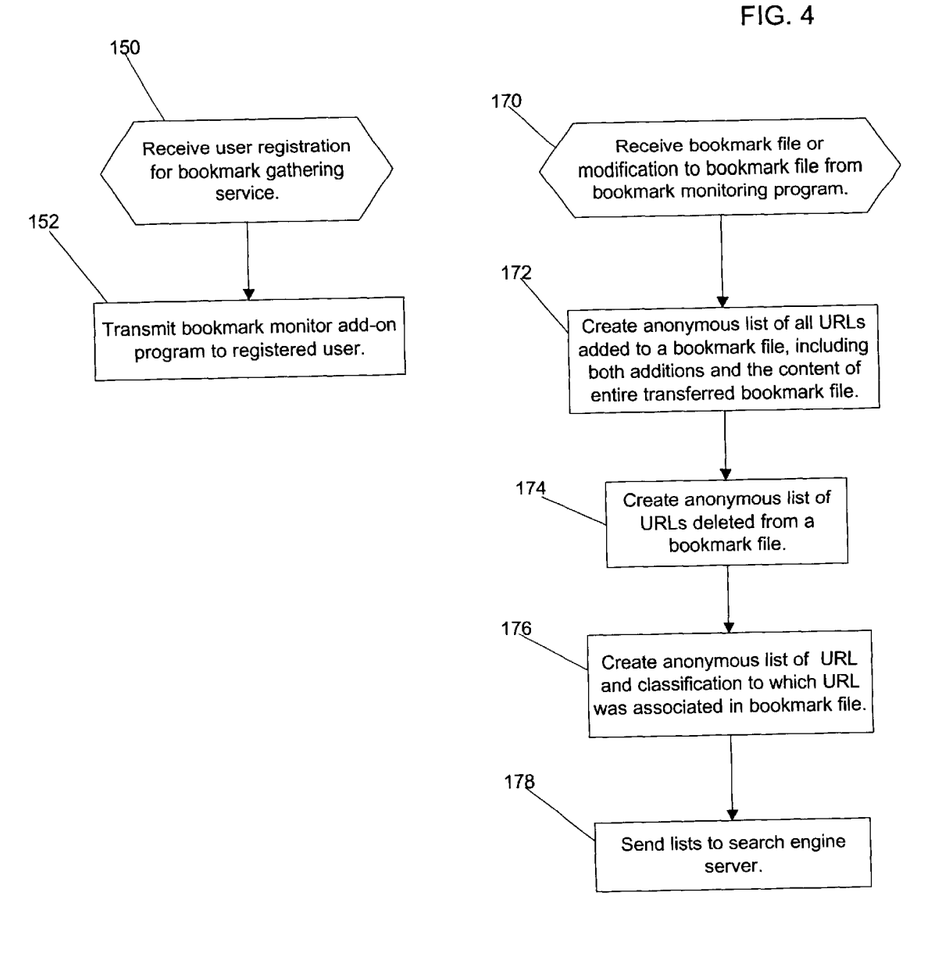
FIG. 4 illustrates logic implemented in the bookmark data gathering server to gather bookmark data from Internet users in accordance with preferred embodiments of the present invention.

FIG. 4 illustrates logic implemented in the bookmark gatherer site 10 to register Internet users and gather data transmitted from bookmark monitor programs 20 executing on user computers for users that have registered with the bookmark monitoring service. Control begins at block 150 with the bookmark gatherer site 10 receiving user registration for the bookmark gathering service from a web browser 14 over the Internet 12. Upon approving the user registration, the bookmark gatherer server 10 transmits (at block 152) the bookmark monitor program 20 to the user computer over the Internet 12.

The bookmark gatherer server 10 begins processing bookmark data at block 170 upon receiving the entire bookmark file 16 from the user computer 4. The bookmark gatherer server 10 creates (at block 172) an anonymous list of all URLs added to the bookmark file 16, including both URLs added via user input 18 on a URL-by-URL basis as well as those URLs present in an entire bookmark file 16 transferred to the bookmark gatherer server 10 at block 106 in FIG. 3. The bookmark gatherer server 10 further creates (at block 172) an anonymous list of all URLs deleted from a bookmark file 16 in response to user input 18. Still further, to the extent the input data 18 transferred from the bookmark monitor 20 includes associations of URLs in the bookmark file with user created classification groups in the bookmark file 16, the bookmark gatherer server 10 further creates a list of URLs and the classification to which each URL is associated. The lists are then sent to the search engine server 6.

In preferred embodiments, the bookmark gatherer server 10 assembles bookmark data anonymously without any information on the identity of the user computer 4 that sent the bookmark file 16 in order to address security and privacy concerns of users. To maintain anonymity, the bookmark gatherer server 10 would assemble the lists from multiple user computers 4, thus gathering the data from many subscribed users.

Figure 5:
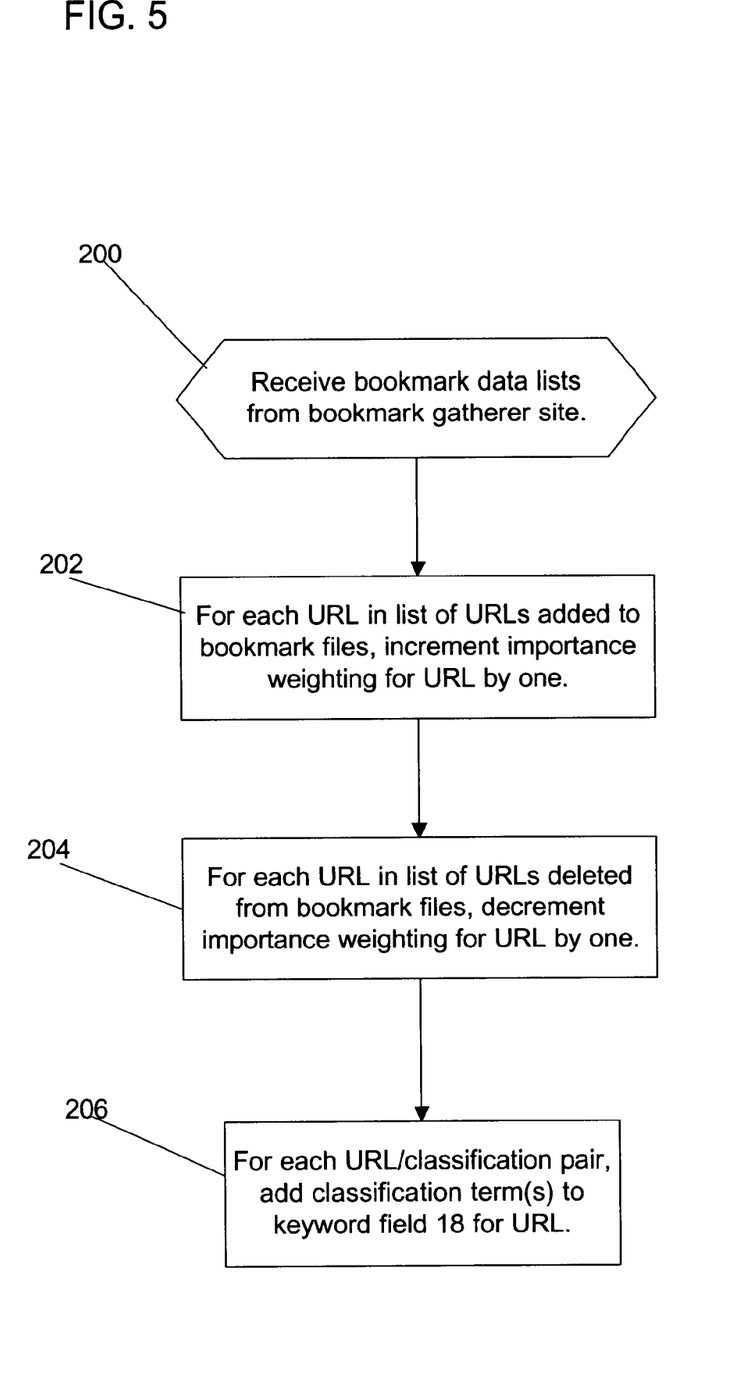
FIG. 5 illustrates logic implemented in the search engine server to use the bookmark data update importance weights in the URL index in accordance with preferred embodiments of the present invention.

FIG. 5 illustrates logic implemented in a software program executed by the search engine server 6 to utilize the bookmark lists assembled by the bookmark gatherer server 10. Control begins at block 200 with the search engine server 6 receiving the bookmark data lists. For each URL in the lists of URLs added to bookmark files, the search engine server 6 would increment (at block 202) the importance weight 34 in the URL entries of URLs added to bookmark files 16, indicating that these URLs have greater importance due to their entry in a user bookmark file 16. For each URL in the list of URLs deleted from user bookmark files 16, the search engine server 6 would decrement (at block 204) the importance weight 34 in the URL entries of URLs deleted from bookmark files 16, indicating that those URLs deleted from a bookmark file 16 have less importance. Then for each URL associated with a user classifier, the search engine server 6 would add (at block 206) the classification term or terms to the keyword field 32 in the entry for the URL associated with the classification term(s). This would provide another search keyword for use with that URL in locating matching search entries.

Figure 6:
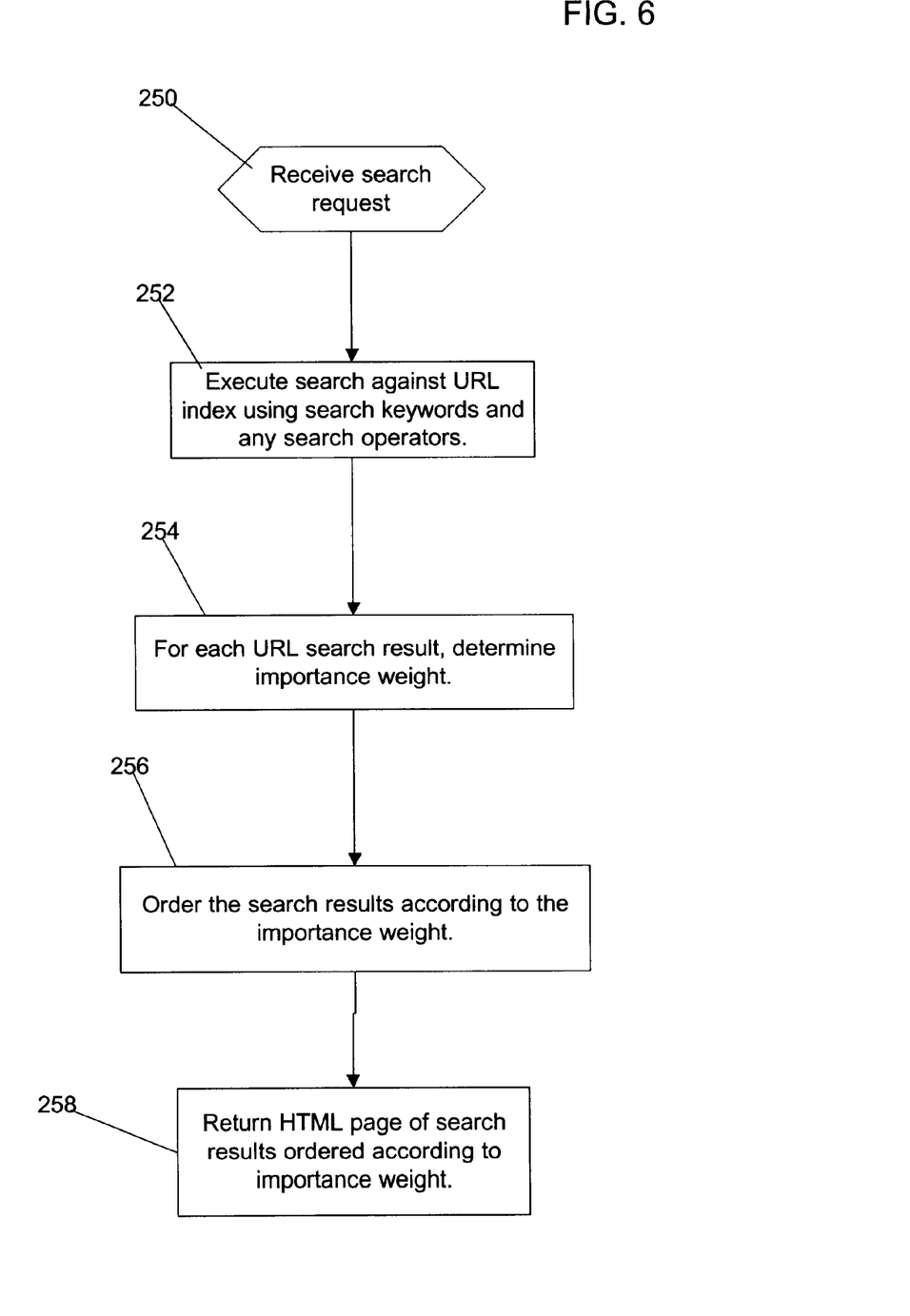
FIG. 6 illustrates logic implemented in the search engine server to process a search request in accordance with preferred embodiments of the present invention.

FIG. 6 illustrates logic implemented in a software program in the search engine server 6 to process a search request. Control begins at block 250 with the search engine 4 receiving a search request from the user web browser 14. The search engine 4 executes (at block 252) the search against the URL index 24 using search keywords and any search operators included in the search. The search engine server 6 then determines (at block 254) the importance for each URL returned in response to the search result and then orders (at block 256) the search results according to the importance weight. The search engine server 6 then returns to the user computer 10 one or more HTML pages including the URL search results ordered according to the importance weighting.

In this way, the user receives search results ranked according to the cumulative importance that all users registered to the bookmark gathering service assign to such URLs through their bookmark files.

Figure 7:
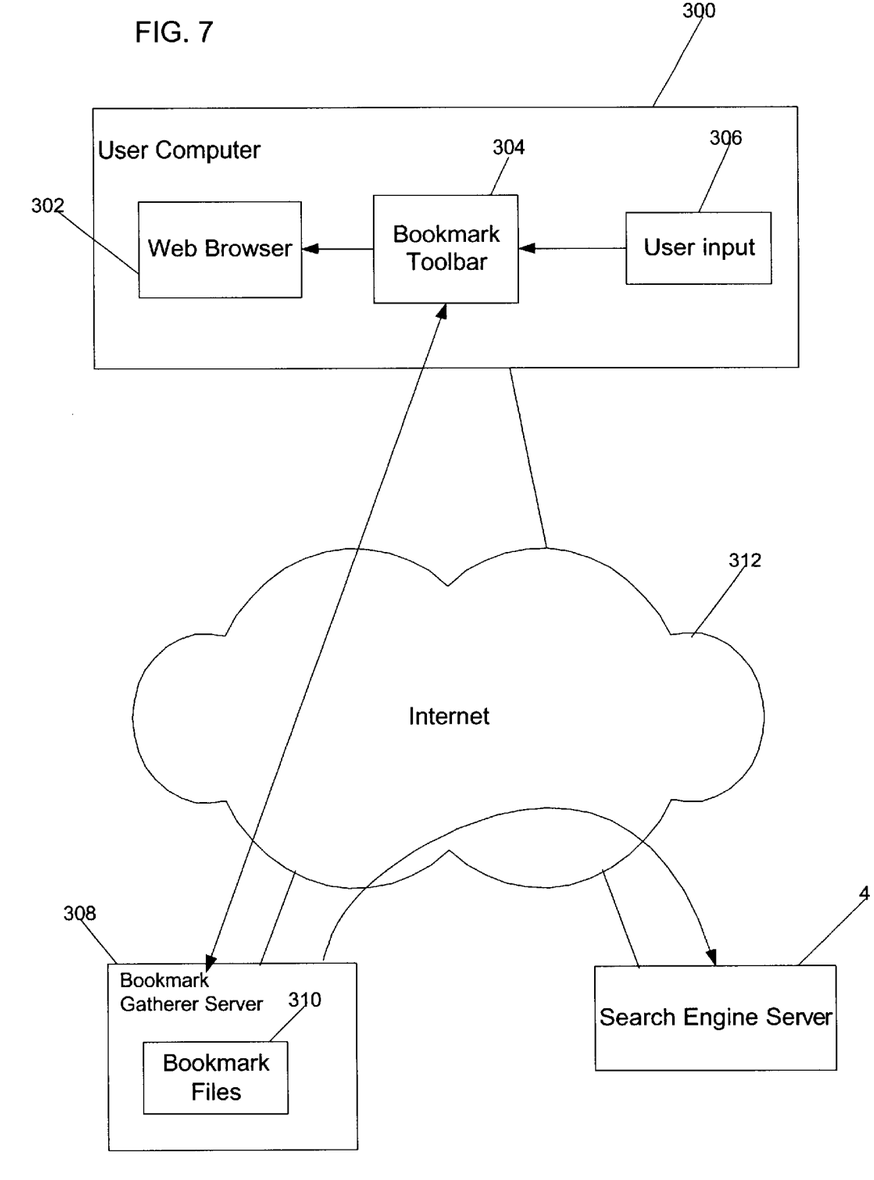
FIG. 7 illustrates an alternative computing environment architecture in accordance with preferred embodiments of the present invention.

FIG. 7 illustrates an alternative embodiment to provide bookmark data to the bookmark gatherer server. A user computer 300 includes a web browser 302. Instead of using the web browser 300 bookmark feature, the bookmark gatherer server 308 provides the user with a bookmark toolbar 304 that displays in the user computer 300 a bookmark interface in a separate window from the web browser application window 300. This bookmark toolbar 304 is opened and displayed whenever the web browser 302 is opened. In this embodiment, the user would maintain the bookmark file 310 on the bookmark gatherer server 308. When the user wants to review the bookmark file 310, the bookmark toolbar 304 would retrieve the bookmark file 310 from the bookmark gatherer server 308. Any changes to the bookmark file, i.e., adding, deleting, or changing classifications, would be made to a copy of the bookmark file 310 buffered in the user computer 300. This buffered bookmark file would be transmitted to the bookmark gatherer server 308. The bookmark gatherer server 308 would then assemble lists of changes to bookmark files as described with respect to FIG. 4.

With preferred embodiments, a search engine database 12 may provide rankings for URLs based on a subjective importance value that is based on how users add, remove, and organize URLs in their bookmark file. This ensures that those URLs that are incorporated into the importance weight include only those web sites that users have deemed important enough to add to their bookmark file. The importance weight would thus not include any web pages that users may inadvertently visit or are of minimal or no interest. The preferred embodiment technique provides a relatively straightforward solution for determining user importance of web sites that does not require complex statistical modeling formulas based on the number of user selections of a page, time between switching to another page, etc.

Preferred embodiments also provide a business framework for gathering user bookmark data. This business framework involves a company gathering bookmark data from users which may then be sold to advertisers or search engine providers. The company gathering the bookmarks and maintaining the bookmark gathering server may offer users something in exchange for providing access to bookmarks, such as free Internet service or some other amenity.

Alternative Embodiments and Conclusions

The following describes some alternative embodiments for accomplishing the present invention.

The preferred embodiments may be implemented as a method, apparatus or program using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative embodiments of the present invention.

Preferred embodiments provided only a singular importance weight to determine the ordering and ranking of URLs. However, in further embodiments the importance weight factor may be combined with other weighting factors gleaned from different types of data, such as the number of times a page was visited.

In preferred embodiments, the data gathering server was managed by a separate company from the search engine provider managing the search engine server 6. However, in alternative embodiments, the search engine provider may itself manage the bookmark gathering server 58 and register users to the bookmark gathering service.

In preferred embodiments, the ordering of search results using the bookmark data was performed at the search engine server 6 before the search results are transmitted to the user computer 4. In alternative embodiments, the user computer may gather bookmark data for a user and use that data internally to order search results received from a search engine server internally at the user computer. In this way, the search result ordering may be based on the bookmark selections of a particular user.

Preferred embodiments were described with respect to the HTTP protocol for transmitting documents between computers within a network. However, those skilled in the art will appreciate that the preferred embodiments may apply to any communication protocol for allowing a client to request and access files in a network environment.

Preferred embodiments were described with respect to presenting search results in HTML pages. However, alternative file formats for building web-like pages may be used, such as Dynamic Hypertext Mark-Up Language (DHTML), the Extensible Markup Language (XML), Cascading Sytle Sheets, any other Standard Generalized Markup Language (SGML), or any other language known in the art for creating interchangeable, structured documents. Further, any version of HTML may be used, including version 2.0, 3.2, 4.0, etc. In yet further embodiments, the requested file may be in any other file format, i.e., other than an SGML type format, capable of being displayed or otherwise executed by the requesting client.

Preferred embodiments were described with respect to a network environment in which pages are provided to a client from a server over a network, such as the Internet. However, in alternative embodiments, the search engine server may be maintained within and used by a single computing device, such as a computer with a hard disk drive, to search files on the computer hard disk drive.

In preferred embodiments, the files being searched are identified by a URL address and may be located on different servers connected over a common network such as the Internet. In alternative embodiments, any file addressing scheme may be used, including a file pathname indicating the location of a file in local storage. In such case, the preferred embodiments may be used to search for files located in local storage that are not dispersed throughout a network.

In summary, the present invention provides a method, system, program, and data structures for providing, accessing, and using bookmark data to supplement information in a search engine database. The bookmark data indicates saved user selected network address, e.g., URLs, that are capable of being selected to access observable data, e.g., a page of text, images, sound file, movie file, etc., at the selected network address.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for gathering information on user preferences for network addresses that are capable of being selected to access observable data at the selected network address, comprising:

maintaining a search engine index of network addresses and at least one keyword and an importance rating associated with each network address, wherein at least one of the network addresses is associated with bookmark data and wherein at least one of the network addresses is not associated with bookmark data, receiving modifications to bookmark data indicating saved user selected network addresses, wherein the modifications to the bookmark data include associating at least one network address with a classification;

transmitting the modifications to the bookmark data to a server over a network, wherein the transmitted bookmark data is used to update the importance rating associated with each network address in the search engine index of network addresses, and wherein a search for one or more keywords is performed against the search engine index of network addresses to identify network addresses that are ordered based on the importance rating associated with each network address; and adding the classification associated with the network address to a keyword field associated with the network address.

2. The method of claim 1, further comprising transmitting an entire bookmark data file to the server.

3. The method of claim 1, wherein the bookmark data is maintained by an Internet browser program and wherein the modifications to the bookmark data are made through the Internet browser program.

4. The method of claim 1, further comprising:
registering for a service over the Internet to provide bookmark data to the server;
receiving an application program over the Internet from the server in response to registering for the service;
executing the application program, wherein the application program receives modifications to the bookmark data and transmits the modifications to the server.

5. The method of claim 1, wherein the modifications to the bookmark data comprise adding network addresses and deleting network addresses.

6. The method of claim 1, further comprising:
determining whether the modifications are to bookmark data designated as private, wherein only those modifications to bookmark data not designated as private are transmitted to the server over the network.

7. A method for gathering user data, comprising:
maintaining a search engine index of network addresses and at least one keyword and an importance rating associated with each network address, wherein at least one of the network addresses is associated with bookmark data and wherein at least one of the network addresses is not associated with bookmark data;
registering Internet users over the Internet for a service;
transmitting over the Internet an application program to execute at computers of registered users connected to the Internet; and
receiving from the application program executing on the user computers connected to the Internet bookmark data from the users, wherein the bookmark data indicates saved user selected network addresses that the user is capable of selecting to access observable data at the selected network address, wherein the bookmark data includes an association of at least one network address with a classification, wherein the classification is added to a keyword field associated with the network address, wherein the bookmark data is used to update the importance rating associated with each network address in the search engine index of network addresses, and wherein a search for one or more keywords is performed against the search engine index of network addresses to identify network addresses that are ordered based on the importance rating associated with each network address.

8. The method of claim 7, further comprising receiving modifications to bookmark data from the application program over the Internet.

9. The method of claim 8, further comprising assembling modifications to bookmark data for multiple registered users in a file.

10. A method for generating a search engine index, comprising:
maintaining a search engine index of network addresses and at least one keyword associated with each network address, wherein user observable data is maintained at the observable data at the network address, wherein at least one of the network addresses is associated with bookmark data and wherein at least one of the network addresses is not associated with bookmark data;
receiving bookmark data gathered from multiple Internet users, wherein the bookmark data indicates saved user selected network addresses that the user is capable of selecting to access observable data at the selected network address;
determining an importance rating for each of the network addresses for which bookmark data was received;

including the determined importance rating in the search engine index;

performing a single search for one or more keywords in the search engine index; and identifying multiple network addresses associated with the one or more keywords, wherein the multiple network addresses are ordered based on the importance rating associated with each network address.

11. The method of claim 10, further comprising:

executing a search query against the index to determine at least one search result; and presenting the search results ordered according to their importance rating.

12. The method of claim 10, further comprising increasing the importance rating for a network address entry in the index for bookmark data indicating that the network address was added to bookmark data.

13. The method of claim 12, further comprising decreasing the importance rating for one network address entry in the index for bookmark data indicating that the network address was removed from bookmark data.

14. The method of claim 12, further comprising:

adding classification terms associated with a network address in the bookmark data to the keyword field of the entry for the associated network address in the index.

15. A method for ordering search results, comprising:

creating an index of network addresses, wherein at least one of the network addresses has associated bookmark data and at least one of the network addresses does not have associated bookmark data;

receiving network addresses returned in response to a user's search request performed with a single search against the index, wherein a user is capable of using a network address to access observable data at the received network address; and using bookmark data including saved user selected network addresses to determine an importance rating for the received network addresses; and using the determined importance rating to order a presentation of the received network addresses.

16. A system for gathering information on user preferences for network addresses that are capable of being selected to access observable data at the selected network address, comprising:

means for maintaining a search engine index of network addresses and at least one keyword and an importance rating associated with each network address, wherein at least one of the network addresses is associated with bookmark data and wherein at least one of the network addresses is not associated with bookmark data;

means for receiving modifications to bookmark data indicating saved user selected network addresses, wherein the modifications to the bookmark data include associating at least one network address with a classification;

means for transmitting the modifications to the bookmark data to a server over a network, wherein the transmitted bookmark data is used to update the importance rating associated with each network address in the search engine index of network addresses, and wherein a search for one or more keywords is performed against the index of network addresses to identify network addresses that are ordered based on the importance rating associated with each network address; and means for adding the classification associated with the network address to a keyword field associated with the network address.

17. The system of claim 16, further comprising means for transmitting an entire bookmark data file to the server.

18. The system of claim 16, wherein the bookmark data is maintained by an Internet browser program and wherein the modifications to the bookmark data are made through the Internet browser program.

19. The system of claim 16, further comprising:

means for registering for a service over the Internet to provide bookmark data to the server;

means for receiving an application program over the Internet from the server in response to registering for the service; and means for executing the application program, wherein the application program receives modifications to the bookmark data and transmits the modifications to the server.

20. The system of claim 16, wherein the modifications to the bookmark data comprise adding network addresses, and deleting network addresses.

21. The system of claim 16, further comprising:

means for determining whether the modifications are to bookmark data designated as private, wherein only those modifications to bookmark data not designated as private are transmitted to the server over the network.

22. A system for gathering user data, comprising:

means for maintaining a search engine index of network addresses and at least one keyword and an importance rating associated with each network address, wherein at least one of the network addresses is associated with bookmark data and wherein at least one of the network addresses is not associated with bookmark data;

means for registering Internet users over the Internet for a service;

means for transmitting over the Internet an application program to execute at computers of registered users connected to the Internet; and means for receiving from the application program executing on the user computers connected to the Internet bookmark data from the users, wherein the bookmark data indicates saved user selected network addresses that the user is capable of selecting to access observable data at the selected network address, wherein the bookmark data includes an association of at least one network address with a classification, wherein the classification is added to a keyword field associated with the network address, wherein the bookmark data is used to update the importance rating associated with each network address in the search engine index of network addresses, and wherein a search for one or more keywords is performed against the search engine index of network addresses to identify network addresses that are ordered based on the importance rating associated with each network address.

23. The system of claim 22, further comprising receiving modifications to bookmark data from the application program over the Internet.

24. The system of claim 23, further comprising assembling modifications to bookmark data for multiple registered users in a file.

25. A system for generating a search engine index, comprising:

means for maintaining a search engine index of network addresses and at least one keyword associated with each network address, wherein user observable data is maintained at the observable data at the network address, wherein at least one of the network addresses is associated with bookmark data and wherein at least one of the network addresses is not associated with bookmark data;

means for receiving bookmark data gathered from multiple Internet users, wherein the bookmark data indicates saved user selected network addresses that the user is capable of selecting to access observable data at the selected network address;

means for determining an importance rating for each of the network addresses for which bookmark data was received;

means for including the determined importance rating in the search engine index;

means for performing a single search for one or more keywords in the search engine index; and means for identifying multiple network addresses associated with the one or more keywords, wherein the multiple network addresses are ordered based on the importance rating associated with each network address.

26. The system of claim 25, further comprising:

means for executing a search query against the index to determine at least one search result; and means for presenting the search results ordered according to their importance rating.

27. The system of claim 25, further comprising means for increasing the importance rating for a network address entry in the index for bookmark data indicating that the network address was added to bookmark data.

28. The system of claim 27, further comprising means for decreasing the importance rating for one network address entry in the index for bookmark data indicating that the network address was removed from bookmark data.

29. The system of claim 27, further comprising:

means for adding classification terms associated with a network address in the bookmark data to the keyword field of the entry for the associated network address in the index.

30. A system for ordering search results, comprising:

means for creating an index of network addresses, wherein at least one of the network addresses has associated bookmark data and at least one of the network addresses does not have associated bookmark data;

means for receiving network addresses returned in response to a user's search request performed with a single search against the index, wherein a user is capable of using a network address to access observable data at the received network address; and means for using bookmark data including saved user selected network addresses to determine an importance rating for the received network addresses; and means for using the determined importance rating to order a presentation of the received network addresses.

31. An information bearing medium including code for gathering information on user preferences for network addresses that are capable of being selected to access observable data at the selected network address, wherein the code is capable of causing a processor to perform:

maintaining a search engine index of network addresses and at least one keyword and an importance rating associated with each network address, wherein at least one of the network addresses is associated with bookmark data and wherein at least one of the network addresses is not associated with bookmark data;

receiving modifications to bookmark data indicating saved user selected network addresses, wherein the modifications to the bookmark data include associating at least one network address with a classification;

transmitting the modifications to the bookmark data to a server over a network, wherein the transmitted bookmark data is used to update the importance rating associated with each network address in the search engine index of network addresses, and wherein a search for one or more keywords is performed against the index of network addresses to identify network addresses that are ordered based on the importance rating associated with each network address; and adding the classification associated with the network address to a keyword field associated with the network address.

32. The information bearing medium of claim 31, wherein the code further causes the computer to perform transmitting an entire bookmark data file to the server.

33. The information bearing medium of claim 31, wherein the bookmark data is maintained by an Internet browser program and wherein the modifications to the bookmark data are made through the Internet browser program.

34. The information bearing medium of claim 31, wherein the code further causes the computer to perform:

registering for a service over the Internet to provide bookmark data to the server;

receiving an application program over the Internet from the server in response to registering for the service;

executing the application program, wherein the application program receives modifications to the bookmark data and transmits the modifications to the server.

35. The information bearing medium of claim 31, wherein the modifications to the bookmark data comprise adding network addresses, and deleting network addresses.

36. The information bearing medium of claim 31, wherein the code further causes the computer to perform:

determining whether the modifications are to bookmark data designated as private, wherein only those modifications to bookmark data not designated as private are transmitted to the server over the network.

37. An information bearing medium including code for gathering user data, wherein the code is capable of causing a processor to perform:

maintaining a search engine index of network addresses and at least one keyword and an importance rating associated with each network address, wherein at least one of the network addresses is associated with bookmark data and wherein at least one of the network addresses is not associated with bookmark data;

registering Internet users over the Internet for a service;

transmitting over the Internet an application program to execute at computers of registered users connected to the Internet; and receiving from the application program executing on the user computers connected to the Internet bookmark data from the users, wherein the bookmark data indicates saved user selected network addresses that the user is capable of selecting to access observable data at the selected network address, wherein the bookmark data includes an association of at least one network address with a classification, wherein the classification is added to a keyword field associated with the network address, wherein the bookmark data is used to update the importance rating associated with each network address in the search engine index of network addresses, and wherein a search for one or more keywords is performed against the search engine index of network addresses to identify network addresses that are ordered based on the importance rating associated with each network address.

38. The information bearing medium of claim 37, wherein the code further causes the computer to perform receiving modifications to bookmark data from the application program over the Internet.

39. The information bearing medium of claim 38, wherein the code further causes the computer to perform assembling modifications to bookmark data for multiple registered users in a file.

40. An information bearing medium including code for generating a search engine index, wherein the code is capable of causing a computer to perform:

maintaining a search engine index of network addresses and at least one keyword associated with each network address, wherein user observable data is maintained at the observable data at the network address, wherein at least one of the network addresses is associated with bookmark data and wherein at least one of the network addresses is not associated with bookmark data;

receiving bookmark data gathered from multiple Internet users, wherein the bookmark data indicates saved user selected network addresses that the user is capable of selecting to access observable data at the selected network address;

determining an importance rating for each of the network addresses for which bookmark data was received;

including the determined importance rating in the search engine index;

performing a single search for one or more keywords in the search engine index; and identifying multiple network addresses associated with the one or more keywords, wherein the multiple network addresses are ordered based on the importance rating associated with each network address.

41. The information bearing medium of claim 40, wherein the code further causes the computer to perform:

executing a search query against the index to determine at least one search result; and presenting the search results ordered according to their importance rating.

42. The information bearing medium of claim 40, wherein the code further causes the computer to perform increasing the importance rating for a network address entry in the index for bookmark data indicating that the network address was added to bookmark data.

43. The information bearing medium of claim 42, wherein the code further causes the computer to perform decreasing the importance rating for one network address entry in the index for bookmark data indicating that the network address was removed from bookmark data.

44. The information bearing medium of claim 42, wherein the code further causes the computer to perform adding classification terms associated with a network address in the bookmark data to the keyword field of the entry for the associated network address in the index.

45. An information bearing medium including code for ordering search results, wherein the code is capable of causing a computer to perform:

creating an index of network addresses, wherein at least one of the network addresses has associated bookmark data and at least one of the network addresses does not have associated bookmark data;

receiving network addresses returned in response to a user's search request performed with a single search against the index, wherein a user is capable of using a network address to access observable data at the received network address;

using bookmark data including saved user selected network addresses to determine an importance rating for the received network addresses; and using the determined importance rating to order a presentation of the received network addresses.

* * * * *